[12] United States Patent  
Onishi et al.

(10) Patent No.: US 9,521,059 B2  
(45) Date of Patent: Dec. 13, 2016

(54) DELIVERY DEVICE, COMMUNICATION SYSTEM, LOAD BALANCING METHOD, AND LOAD BALANCING PROGRAM

(71) Applicant: NEC Corporation, Tokyo (JP)

(72) Inventors: Takeo Onishi, Tokyo (JP); Takahiro Shiroshima, Toyko (JP); Masahiro Kawato, Tokyo (JP); Tadayuki Oono, Tokyo (JP)

(73) Assignee: NEC Corporation, Tokyo (JP)

( * ) Notice: Subject to any disclaimer, the term of this patent is extended or adjusted under 35 U.S.C. 154(b) by 43 days.

(21) Appl. No.: 14/439,529

(22) PCT Filed: Oct. 17, 2013

(86) PCT No.: PCT/JP2013/006159  
§ 371 (c)(1),  
(2) Date: Apr. 29, 2015

(87) PCT Pub. No.: WO2014/068879  
PCT Pub. Date: May 8, 2014

(65) Prior Publication Data  
US 2015/0304201 A1    Oct. 22, 2015

(30) Foreign Application Priority Data  
Oct. 31, 2012 (JP) ................. 2012-240768

(51) Int. Cl.  
*H04L 12/26* (2006.01)  
*H04L 29/08* (2006.01)  
(Continued)

(52) U.S. Cl.  
CPC ............. *H04L 43/10* (2013.01); *H04L 43/16* (2013.01); *H04L 47/125* (2013.01); *H04L 67/26* (2013.01); *H04L 69/28* (2013.01); *H04L 47/28* (2013.01)

(58) Field of Classification Search  
CPC ........ H04L 43/10; H04L 43/16; H04L 47/125; H04L 47/28; H04L 67/26; H04L 69/28; H04L 43/0811; H04L 43/0835; H04L 43/0841; H04L 45/26; H04L 2012/5678; H04J 3/14; H04W 72/0486  
(Continued)

(56) References Cited

U.S. PATENT DOCUMENTS 6,956,840 B1 * 10/2005 Proctor, Jr. .......... H04B 7/2628  
                                                     370/342  
7,395,444 B2 * 7/2008 Ives ................... G06F 11/3079  
                                                     709/201

(Continued)

FOREIGN PATENT DOCUMENTS

AU      2009241693 B2    11/2009  
CA        2722156 A1    11/2009  
(Continued)

OTHER PUBLICATIONS

International Search Report issued in PCT/JP2013/006159, mailed Dec. 3, 2013, with English Translation, 5 pages.

*Primary Examiner* — Chi H Pham  
*Assistant Examiner* — Robert Lopata  
(74) *Attorney, Agent, or Firm* — Wilmer Cutler Pickering Hale and Dorr LLP

(57) ABSTRACT

Provided are a delivery device, a communication system, a load balancing method, and a load balancing program that enable processing loads for maintaining connections with terminals to be balanced over time, and enable the real time property of message delivery to be maintained for an event notification service. The delivery device is provided with: a communication unit (11) that transmits, to each terminal connected to the delivery device, a keepalive signal to maintain the connection between the delivery device and each terminal when there is no data to be delivered; and a  
(Continued)

transmission time determination unit (12) that divides a period in which the communication unit (11) transmits a keepalive signal into a plurality of time slots, calculates the expected number of transmissions of the keepalive signal for each time slot on the basis of keepalive signal interval information, which represents the interval of the keepalive signal for each terminal, and, if the expected number of transmissions exceeds a predefined threshold value, transmits, to the communication unit (11), the keepalive signal for the portion exceeding the threshold value in the time slot prior to the time slot.

12 Claims, 9 Drawing Sheets

(51) Int. Cl.
    *H04L 29/06*     (2006.01)
    *H04L 12/803*     (2013.01)
    *H04L 12/841*     (2013.01)

(58) Field of Classification Search
    USPC .................................................... 370/248
    See application file for complete search history.

(56) References Cited

U.S. PATENT DOCUMENTS

| | | | |
|---|---|---|---|
| 8,442,230 B1* | 5/2013 | Ng | H04L 43/10 380/260 |
| 2001/0000194 A1* | 4/2001 | Sequeira | G06F 9/4881 725/39 |
| 2003/0061340 A1* | 3/2003 | Sun | H04L 12/2602 709/224 |
| 2007/0112954 A1* | 5/2007 | Ramani | H04L 29/06027 709/224 |
| 2008/0215727 A1* | 9/2008 | Denis | H04L 41/06 709/224 |
| 2009/0158098 A1* | 6/2009 | Rahman | H04L 41/0613 714/57 |
| 2009/0274058 A1* | 11/2009 | Seto | H04W 76/045 370/252 |
| 2010/0118733 A1* | 5/2010 | Wu | H04W 52/343 370/254 |
| 2011/0060824 A1* | 3/2011 | Lundstrom | H04L 43/10 709/224 |
| 2011/0161513 A1* | 6/2011 | Viers | H04L 12/2697 709/231 |
| 2013/0114416 A1* | 5/2013 | Rao | H04L 43/10 370/241 |
| 2015/0142961 A1* | 5/2015 | Ogawa | H04L 41/0816 709/224 |

FOREIGN PATENT DOCUMENTS

| | | |
|---|---|---|
| JP | 2004-120547 A | 4/2004 |
| JP | 2010-074216 A | 4/2010 |
| JP | 2010-267104 A | 11/2010 |
| JP | 2011-523525 A | 8/2011 |
| JP | 2012-174018 A | 9/2012 |
| WO | WO-2009/134453 A1 | 11/2009 |

* cited by examiner

| PORT | ADDRESS |
|---|---|
| 11111 | 192.168.0.2 |
| 23121 | 192.168.0.5 |
| ... | ... |

DELIVERY DEVICE, COMMUNICATION SYSTEM, LOAD BALANCING METHOD, AND LOAD BALANCING PROGRAM

TECHNICAL FIELD

This application is a national stage application of International Application No. PCT/JP2013/006159, filed Oct. 17, 2013, which claims priority to Japanese Patent Application No. JP2012-240768, filed Oct. 31, 2012, the disclosures of which are incorporated herein in their entirety by reference thereto. The present invention relates to a delivery device, a communication system, a load balancing method, and a load balancing program to provide a user with an event notification service.

BACKGROUND ART

Event notification services, which actively notify events from server apparatuses to terminals via IP (Internet Protocol) networks, such as an incoming call notification function in VoIP (Voice over Internet Protocol) and an update notification function in SNS (Social Networking Service), have been available. A notification from a server apparatus to a terminal in the event notification services is referred to as a push notification or a push message. A server apparatus which transmits push messages (hereinafter referred to as a push server) receives requests of notification, such as incoming call notifications in VoIP, update notifications in SNS, chat message deliveries, and update notifications of a cloud storage, from a service provider server (hereinafter referred to as an application server). The application server is a server apparatus that a service provider, such as an SNS administrator, uses.

The service provider, by using the application server, requests the push server to deliver a message addressed to application software (hereinafter simply referred to as an application) that the service provider provides. The service provider provides a user with an application to use a service in advance. The user then executes the application provided by the service provider on a terminal.

The push server, by following the message delivery request, transmits a push message to software (hereinafter referred to as a push client) running on the terminal. The push client hands the received message to the addressed application. The application carries out processing in accordance with the contents of the message received from the push client. For example, the application notifies the user of information or acquires updated contents from a contents server by communicating with the contents server.

Terminals use various networks, such as a mobile network and a wireless LAN. In some cases, terminals work under a NAT (Network Address Translation) environment, depending on the network used. That is, in those cases, a router with a NAT function is placed between the push server and the terminals.

The router with a NAT function, by using a NAT translation table, translates global addresses to private addresses, and vice versa, of terminals. The NAT translation table is information that associates an IP address and a port of a terminal with a port of the router. FIG. 8 is an explanatory diagram illustrating an example of the NAT translation table. The "address" column illustrated in FIG. 8 contains IP addresses of terminals. FIG. 9 is an explanatory diagram illustrating a manner in which a packet is transferred from a push server to a terminal via a router.

A terminal 700 illustrated in FIG. 9 is connected to a push server 600 via a router 800 with a NAT function. That is, the terminal 700 is arranged under a NAT. While being in this state, for example, when a push client operating on the terminal 700 is connected by TCP to a push server on the Internet via the router, the router 800 updates the NAT translation table. Specifically, the router 800 stores a private address of the terminal and a port number that the push client uses in the NAT translation table. In this example, it is assumed that the private address is "192.168.0.2" and the port number is "11111". It is also assumed that the global address of the router is "23.42.64.168".

When the router 800 transfers packets received from the terminal 700 to the push server 600, the router 800 translates transmission source addresses to the global address of the router 800. Therefore, the push server 600 recognizes the global address of the router 800, not the private address of the terminal 700, as a transmission source address. In consequence, when the push server 600 transmits packets to the terminal 700, the push server 600 transmits the packets to the global address of the router 800. When the router 800 receives packets from the push server 600, the router 800 translates destination addresses of the packets to the private address of the terminal 700 based on the NAT translation table and transfers the packets to the terminal 700.

When there is no communication for a certain time, the IP address and the port number of the terminal stored in the NAT translation table are deleted from the NAT translation table due to a timeout. Thereafter, the router becomes unable to translate destination addresses of packets addressed to the terminal, which are received from the push server, to the private address of the terminal. In consequence, packets transmitted from the push server no longer reach the terminal. Thus, in order to maintain the normal TCP connection between the push server and the terminal, it is necessary for the push server and the terminal to have a periodical communication therebetween so as not to cause a timeout on the NAT translation table. A signal that is transmitted and received between a push server and a terminal to maintain a connection is referred to as a keepalive (KeepAlive) signal (hereinafter also referred to as a connection maintenance signal).

When a terminal uses a mobile network, such as 3G networks and LTE (Long Term Evolution), the terminal switches wireless statuses in accordance with the communication state to save power. For example, the terminal changes the wireless status to a standby status or an active status in accordance with the communication state. In switching the wireless statuses, the terminal transmits and receives control signals to change the wireless status to and from the mobile network. When an application or the like, which operates on the terminal, generates communications periodically, the wireless status on the terminal repeats the standby status and the active status alternately, causing a lot of control signals to flow on the mobile network and congestion to take place on the mobile network.

Accordingly, when transmissions and receptions of keepalive signals are carried out periodically between a push server and a lot of terminals, a processing load on the push server to respond to the keepalive signals increases, and congestion of control signals on the mobile network is more likely to take place.

FIGS. 10A and 10B are explanatory diagrams illustrating transmission cycles of keepalive signals. A NAT translation table held by a router has a different feature with respect to each router. For example, a timeout period of a NAT translation table differs from router to router. Thus, transmission cycles of keepalive signals to a terminal may be set at various values in accordance with a router connected to the terminal. FIG. 10A illustrates waveforms each of which represents a transmission cycle of a keepalive signal transmitted from a push server to each terminal. FIG. 10B illustrates a waveform created by adding up the waveforms for respective terminals illustrated in FIG. 10A. As illustrated in FIG. 10A, when transmission cycles of keepalive signals to the respective terminals differ from one another, there are some instants when transmission times of the keepalive signals to the respective terminals concentrate (portions circled by dotted lines as illustrated in FIG. 10). At those instants, there is a possibility that a load on the push server becomes high.

FIG. 11 is an explanatory diagram illustrating a manner in which the number of keepalive signals increases and decreases in recovery from a network failure. Connections between a push server and respective terminals are sometimes interrupted due to a network failure. In that case, when the network failure is resolved, reconnections between the push server and the respective terminals are carried out at the same time. After that, up to the time that the respective terminals start communication, transmissions and receptions of keepalive signals are carried out periodically between the push server and the respective terminals. During this period, as illustrated in FIG. 11, instants at which transmission times of keepalive signals to the respective terminals concentrate (portions circled by dotted lines as illustrated in FIG. 11) come periodically. Therefore, there is a possibility that a load on the push server becomes high periodically.

When the push server becomes high-loaded, the number of deliverable push messages per unit time decreases. As a result, there is a possibility that the real time property of message delivery is impaired and/or the call loss probability increases.

A communication system that, in a network environment in which a LAN and the Internet are interconnected, makes it possible to easily carry out, at a desirable timing, a connection from a terminal on the Internet side to a device inside the LAN to which private IP addresses are assigned, has been developed (for example, see PTL 1). In a communication system disclosed in PTL 1, a server apparatus placed on the Internet side transfers communications between terminals and devices. Devices inside the LAN, even when not communicating with terminals, transmit keepalive packets to the server apparatus in order to maintain a connection to the server apparatus.

CITATION LIST

Patent Literature

PTL 1: Japanese Unexamined Patent Application Publication No. 2004-120547

SUMMARY OF INVENTION

Technical Problem

In the communication system disclosed in PTL 1, the server apparatus determines transmission cycles of keepalive packets and sets the determined transmission cycles to the devices. Thus, the server apparatus is capable of changing the lengths of the transmission cycles of keepalive packets in accordance with a reception load or the like on the apparatus. However, because the server apparatus controls only the transmission cycles of keepalive packets of the respective terminals, there is a possibility that a lot of terminals transmit keepalive packets at the same time. In that case, there is a possibility that the server apparatus becomes high-loaded, and the real time property of the communication between the terminals and the devices is impaired.

Accordingly, an object of the present invention is to provide a delivery device, a communication system, a load balancing method, and a load balancing program that, in an event notification service(s), make it possible to temporally distribute a processing load to maintain a connection(s) to a terminal(s) and to maintain the real time property of message delivery.

Solution to Problem

A delivery device according to the present invention includes a communication unit that, when there is no data to be delivered, transmits, to a respective terminal(s) connected to the delivery device, a connection maintenance signal(s) to maintain a connection(s) between the delivery device and the respective terminal(s), and a transmission time determination unit that divides into a plurality of time slots a period in which the communication unit transmits the connection maintenance signal(s), calculates the number of expected transmissions of connection maintenance signals with respect to each time slot based on connection maintenance signal interval information indicating an interval(s) between connection maintenance signals to the respective terminal(s), and, when the number of expected transmissions exceeds a predetermined threshold value, makes the communication unit transmit, in a time slot(s) that is/are earlier than the time slot(s), a connection maintenance signal(s) corresponding to the number of expected transmissions exceeding the threshold value.

A communication system according to the present invention includes a delivery device, and a plurality of terminals that are communicable with the delivery device, wherein the terminals include connection maintenance control units that communicate to the delivery device connection maintenance signal interval information to specify an interval(s) between connection maintenance signals to maintain a connection(s) between the delivery device and the terminals, and the delivery device includes a communication unit that, when there is no data to be delivered, transmits a connection maintenance signal(s) to the respective terminal(s), and a transmission time determination unit that divides into a plurality of time slots a period in which the communication unit transmits the connection maintenance signal(s), calculates the number of expected transmissions of connection maintenance signals with respect to each time slot based on the connection maintenance signal interval information received from the respective terminal(s), and, when the number of expected transmissions exceeds a predetermined threshold value, makes the communication unit transmit, in a time slot(s) that is/are earlier than the time slot(s), a connection maintenance signal(s) corresponding to the number of expected transmissions exceeding the threshold value.

A load balancing method according to the present invention is carried out by a delivery device that, when there is no data to be delivered, transmits, to a respective terminal(s) connected to the delivery device, a connection maintenance signal(s) to maintain a connection(s) between the delivery device and the respective terminal(s), and the method includes the steps of dividing into a plurality of time slots a period in which the delivery device transmits the connection maintenance signal(s), calculating the number of expected transmissions of connection maintenance signals with respect to each time slot based on connection maintenance signal interval information indicating an interval(s) between connection maintenance signals to the respective terminal(s), and, when the number of expected transmissions exceeds a predetermined threshold value, transmitting a connection maintenance signal(s) corresponding to the number of expected transmissions exceeding the threshold value in a time slot(s) that is/are earlier than the time slot(s).

A load balancing program according to the present invention makes a computer execute a step of, when there is no data to be delivered, transmitting, to a respective terminal(s) connected to the computer, a connection maintenance signal(s) to maintain a connection(s) between the computer and the respective terminal(s), and a step of dividing into a plurality of time slots a period in which the computer transmits the connection maintenance signal(s), calculating the number of expected transmissions of connection maintenance signals with respect to each time slot based on connection maintenance signal interval information indicating an interval(s) between connection maintenance signals to the respective terminal(s), and, when the number of expected transmissions exceeds a predetermined threshold value, transmitting, in a time slot(s) that is/are earlier than the time slot(s), a connection maintenance signal(s) corresponding to the number of expected transmissions exceeding the threshold value.

Advantageous Effects of Invention

According to the present invention, in an event notification service(s), it is possible to temporally distribute a processing load to maintain a connection(s) between a push server and a terminal(s) and to maintain the real time property of message delivery.

DESCRIPTION OF EMBODIMENTS

First Exemplary Embodiment

A first exemplary embodiment of the present invention will be described below with reference to the accompanying drawings.

Figure 1:
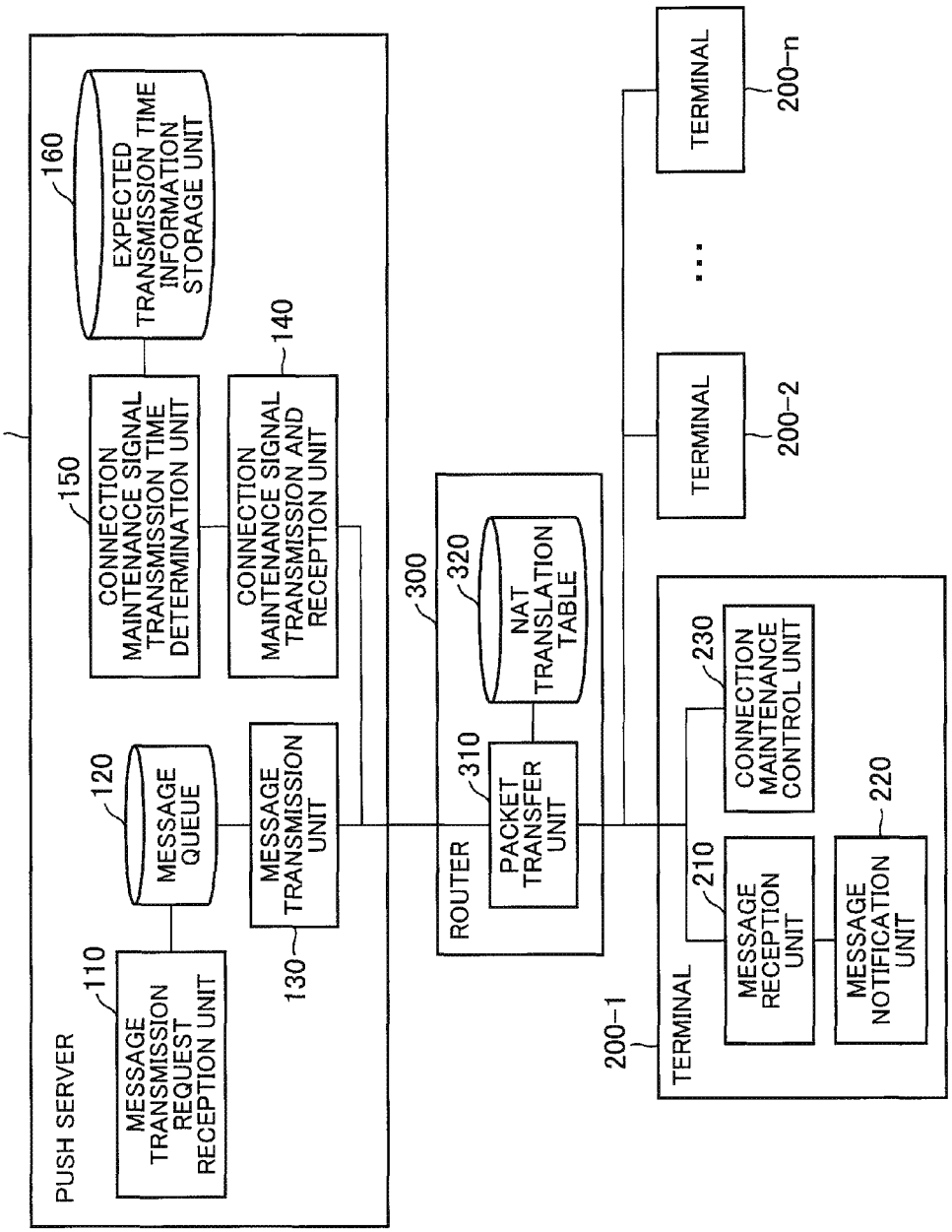
FIG. 1 is a block diagram illustrating a configuration of a first exemplary embodiment of a communication system according to the present invention.

FIG. 1 is a block diagram illustrating a configuration of the first exemplary embodiment of a communication system according to the present invention.

As illustrated in FIG. 1, the communication system (hereinafter referred to as a message delivery system) according to the present invention includes a push server 100, terminals 200-1 to 200-n, and a router 300. Although, in FIG. 1, the router 300 is exemplified as a sole router, any number of routers may be connected.

The push server 100 includes a message transmission request reception unit 110, a message queue 120, a message transmission unit 130, a connection maintenance signal transmission and reception unit 140, a connection maintenance signal transmission time determination unit 150, and an expected transmission time information storage unit 160.

The message transmission request reception unit 110 receives a message transmission request(s) and a message(s) corresponding to the message transmission request(s) from an application server (not illustrated) which is communicable with the push server 100. The message transmission request reception unit 110 receives a push message(s) as a message(s) corresponding to the message transmission request(s).

The message queue 120 stores the push message(s) corresponding to the message transmission request(s).

The message transmission unit 130 transmits the push message(s) to the terminals 200-1 to 200-n. Specifically, the message transmission unit 130 transmits the push message(s) stored in the message queue 120 to the terminals 200-1 to 200-n in accordance with the message transmission request(s) received by the message transmission request reception unit 110.

The connection maintenance signal transmission and reception unit 140 transmits and receives a keepalive signal(s) to and from the terminals 200-1 to 200-n.

The connection maintenance signal transmission time determination unit 150 determines an expected transmission time(s) of the keepalive signal(s) to be transmitted by the connection maintenance signal transmission and reception unit 140 to a respective terminal(s).

The expected transmission time information storage unit 160 stores information indicating the expected transmission time(s) determined by the connection maintenance signal transmission time determination unit 150.

The message transmission request reception unit 110, the message transmission unit 130, the connection maintenance signal transmission and reception unit 140, and the connection maintenance signal transmission time determination unit 150 are implemented by a CPU or the like included in the push server 100. The message queue 120 and the expected transmission time information storage unit 160 are implemented by a storage device, such as a memory, included in the push server 100.

The terminals 200-1 to 200-n are, for example, communication terminals, such as cell phones.

The terminal 200-1 includes a message reception unit 210, a message notification unit 220, and a connection maintenance control unit 230. The message reception unit 210, the message notification unit 220, and the connection maintenance control unit 230 operate as a push client on the terminal. The configurations of the terminals 200-2 to 200-*n* are the same as the terminal 200-1 and description thereof will thus be omitted.

The message reception unit 210 receives the push message(s) delivered from the push server 100.

The message notification unit 220 hands the push message(s) to an application operating on the terminal.

The connection maintenance control unit 230 transmits and receives a keepalive signal(s) to and from the push server 100.

The message reception unit 210, the message notification unit 220, and the connection maintenance control unit 230 are implemented by a CPU or the like included in the terminal 200-1.

The router 300 is a router device that includes a NAT function. The router 300, by using the NAT function, relays communications between the push server 100 and the terminals 200-1 to 200-*n*.

The router 300 includes a packet transfer unit 310 and a NAT translation table 320.

The packet transfer unit 310 transfers packets transmitted and received between the push server 100 and the terminals 200-1 to 200-*n* based on information stored in the NAT translation table 320.

The NAT translation table 320 contains information indicating a correspondence(s) between a global address(es) and a private address(es) of a terminal(s).

The packet transfer unit 310 is implemented by a CPU or the like included in the router 300. The NAT translation table 320 is implemented by a storage device, such as a memory, included in the router 300.

Next, operations of the first exemplary embodiment will be described.

First, an operation of the push server 100 when the push server 100 and a respective terminal(s) carry out a transmission(s) and reception(s) of a keepalive signal(s) by using an HTTP long polling protocol (hereinafter simply referred to as long polling).

The long polling is a protocol in which, for an HTTP request from a terminal, when a push server has a push message to be delivered to the terminal, the push server transmits an HTTP response including the push message immediately, and, when the push server does not have any push message to be delivered to the terminal, the push server holds the HTTP response and waits for a push message to be delivered to the terminal to become available. In the long polling, an HTTP response and a succeeding HTTP response thereof are used as keepalive signals. When a time that the requesting terminal has specified in advance is reached, the push server, which has received the HTTP request in accordance with the long polling, transmits an HTTP response, which does not include any push message, to the terminal as a keepalive signal. The terminal which receives the HTTP response transmits an HTTP request in accordance with the long polling again.

Figure 2:
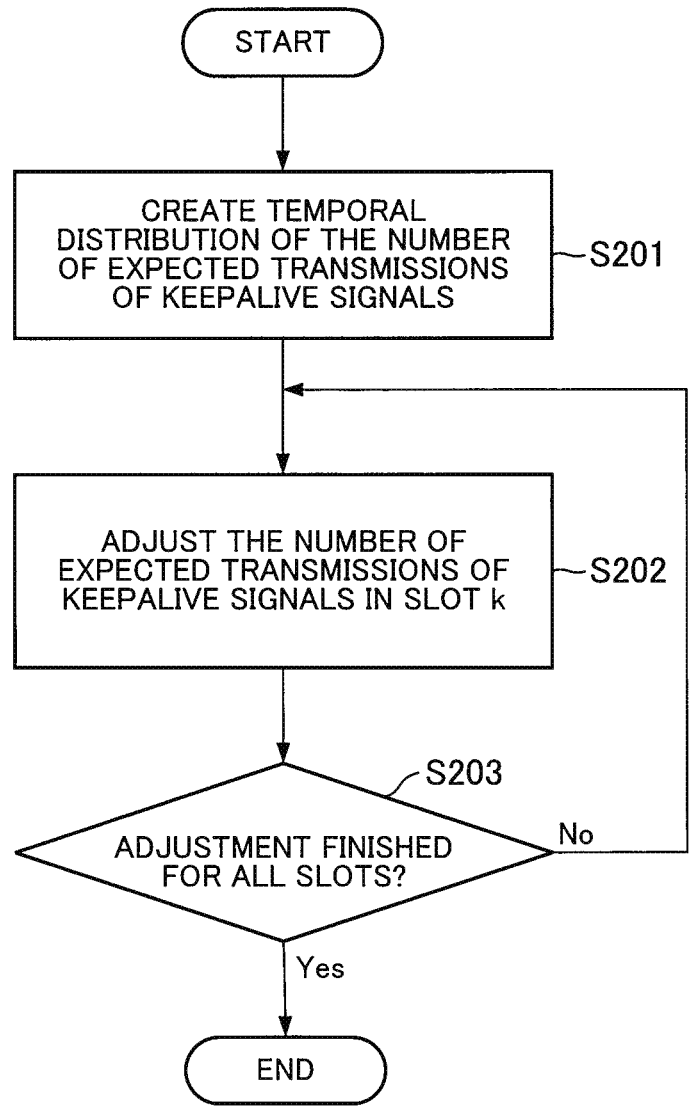
FIG. 2 is a flowchart illustrating adjustment processing of the number of expected transmissions of keepalive signals.

FIG. 2 is a flowchart illustrating adjustment processing of the number of expected transmissions of keepalive signals.

The connection maintenance control units 230 of the terminals 200-1 to 200-*n* transmit information to specify a transmission interval(s) between keepalive signals (hereinafter referred to as keepalive interval information or connection maintenance signal interval information) to the push server 100 in advance. The connection maintenance signal transmission and reception unit 140 of the push server 100 holds the keepalive interval information received from a respective terminal(s). The keepalive interval information of the respective terminal(s) may be held by the push server 100 in advance. For example, a user may store the keepalive interval information of the respective terminal(s) in a storage unit (not illustrated) of the push server 100 in advance.

The connection maintenance signal transmission time determination unit 150 of the push server 100, based on keepalive interval information of each terminal held by the connection maintenance signal transmission and reception unit 140, creates a temporal distribution of the number of expected transmissions of keepalive signals (step S201).

Processing to create a temporal distribution of the number of expected transmissions of keepalive signals in step S201 will be described below.

The connection maintenance signal transmission time determination unit 150 creates a temporal distribution of the number of expected transmissions of keepalive signals with respect to a period during which the connection maintenance signal transmission and reception unit 140 transmits a connection maintenance signal(s). The connection maintenance signal transmission time determination unit 150 creates the temporal distribution, for example, at every five minutes. A period which is a unit of creation of a temporal distribution (hereinafter referred to as a distribution creation period), for example, may be preset by a user, or may be dynamically set by the connection maintenance signal transmission time determination unit 150 depending on a load on the push server 100.

The connection maintenance signal transmission time determination unit 150 divides the distribution creation period by a time slot Δt. At is, for example, preset by the user.

The connection maintenance signal transmission time determination unit 150, based on the keepalive interval information for each terminal held by the connection maintenance signal transmission and reception unit 140, calculates an expected transmission time(s) of a keepalive signal(s) to each terminal. The connection maintenance signal transmission time determination unit 150 stores the calculated expected transmission time(s) in the expected transmission time information storage unit 160.

The connection maintenance signal transmission time determination unit 150, based on the calculated expected transmission time(s), calculates the number of expected transmissions of keepalive signals in each slot k (k=1, 2, . . . ), into which the distribution creation period is divided by Δt.

After carrying out the processing in step S201, the connection maintenance signal transmission time determination unit 150 adjusts the number of expected transmissions of keepalive signals with respect to each slot (step S202).

Figure 3:
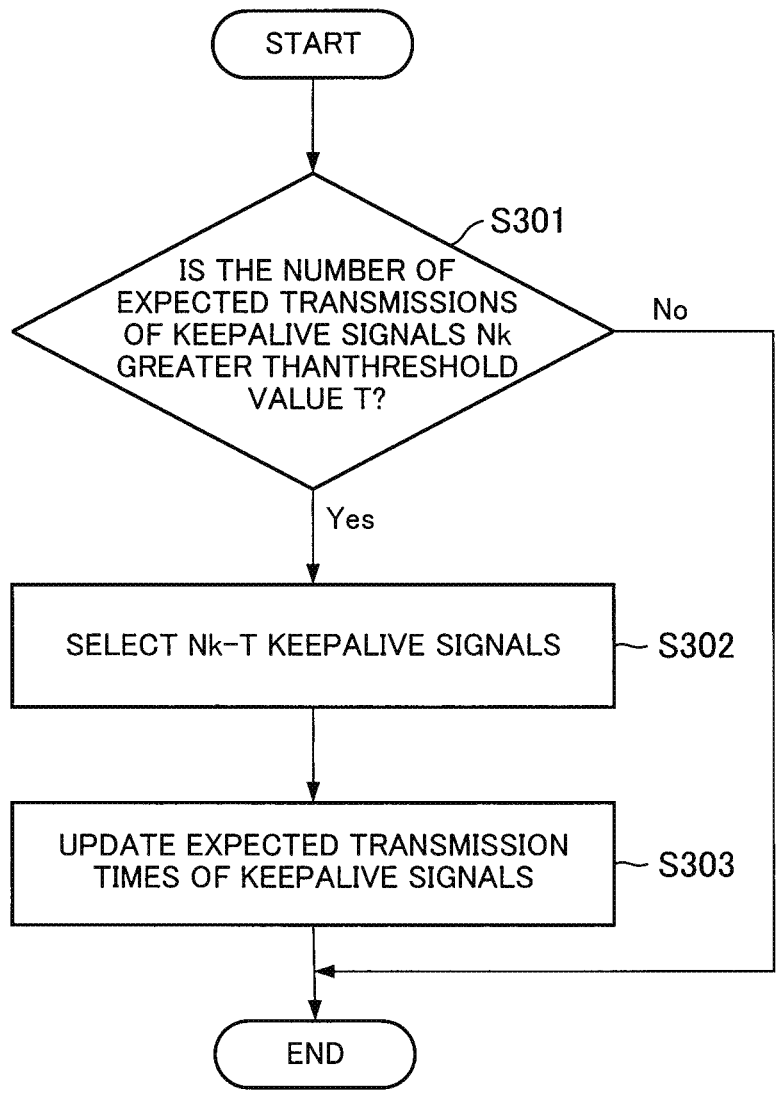
FIG. 3 is a flowchart illustrating an operation of a connection maintenance signal transmission time determination unit in step S202.

An operation of the connection maintenance signal transmission time determination unit 150 in step S202 will be described below. FIG. 3 is a flowchart illustrating the operation of the connection maintenance signal transmission time determination unit 150 in step S202.

The connection maintenance signal transmission time determination unit 150 compares the number of expected transmissions of keepalive signals $N_k$ in a slot k with a threshold value T of the number of expected transmissions of keepalive signals per slot (step S301). The threshold value T may be preset by the user or may be dynamically determined by the connection maintenance signal transmission time determination unit 150 depending on a load on the push server 100.

Figure 4:
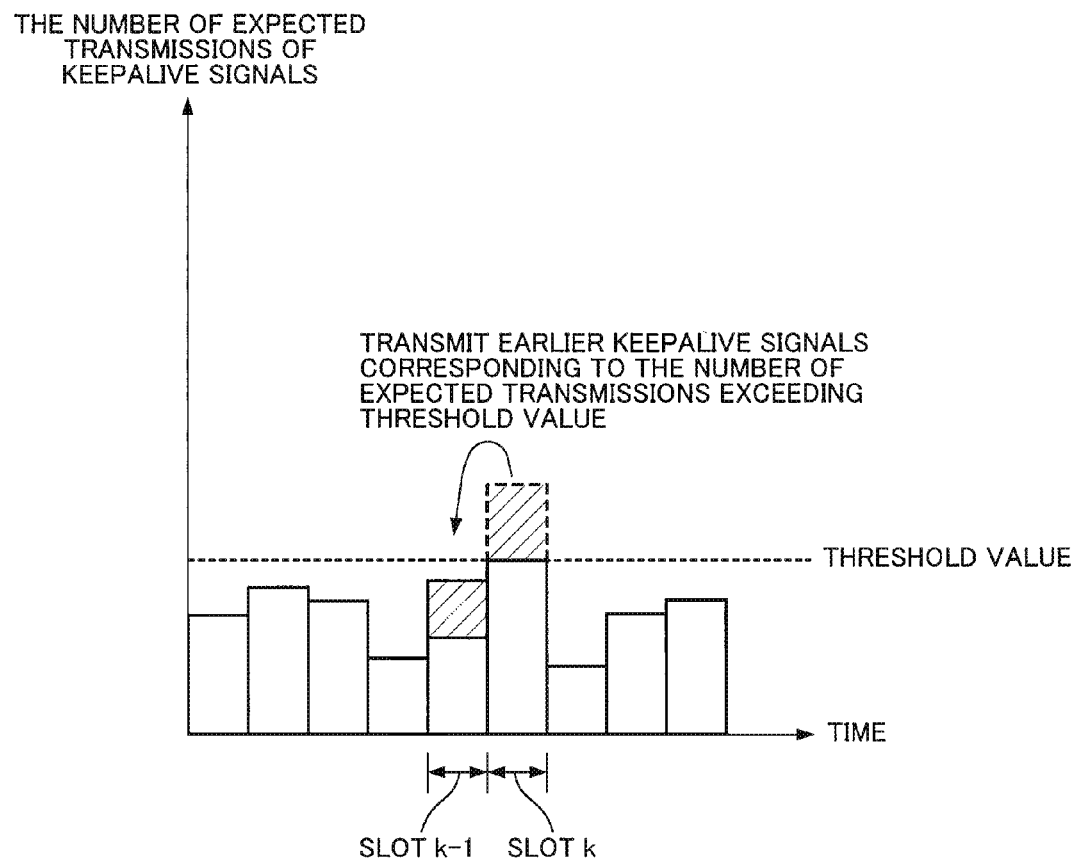
FIG. 4 is an explanatory diagram illustrating a manner in which the number of expected transmissions of keepalive signals is adjusted.

When, as illustrated in FIG. 3, the number of expected transmissions of keepalive signals $N_k$ in the slot k is less than or equal to the threshold value T (No in step S301), the connection maintenance signal transmission time determination unit 150 does not carry out an adjustment of the number of expected transmissions of keepalive signals in the slot. When the number of expected transmissions of keepalive signals $N_k$ in the slot k exceeds the threshold value T (Yes in step S301), the connection maintenance signal transmission time determination unit 150 adjusts the number of expected transmissions of keepalive signals so that a keepalive signal(s) corresponding to the number of expected transmissions of keepalive signals exceeding the threshold value $T(N_k-T)$ is/are transmitted in a slot that is earlier than the slot k. In the first exemplary embodiment, the connection maintenance signal transmission time determination unit 150 adjusts the number of expected transmissions of keepalive signals so that a keepalive signal(s) corresponding to the number of expected transmissions of keepalive signals exceeding the threshold value $T(N_k-T)$ is/are transmitted in a slot k−1 immediately preceding the slot k. FIG. 4 is an explanatory diagram illustrating a manner in which the number of expected transmissions of keepalive signals is adjusted. A graph illustrated in FIG. 4 shows the number of expected transmissions of keepalive signals in each slot. The shaded portion in the graph indicates a keepalive signal(s) corresponding to the number of expected transmissions of keepalive signals exceeding a threshold value in the slot k.

Specifically, first, the connection maintenance signal transmission time determination unit 150 identifies a keepalive signal(s) the expected transmission time(s) of which is/are included in the slot k and selects $N_k-T$ keepalive signal(s) from among the identified keepalive signals (step S302). The connection maintenance signal transmission time determination unit 150 shifts the expected transmission time(s) of the $N_k-T$ selected keepalive signal(s) earlier in time so that the transmission(s) of the keepalive signal(s) is/are carried out in the slot k−1 (step S303). In other words, the connection maintenance signal transmission time determination unit 150 updates the expected transmission time(s) of a keepalive signal(s) stored in the expected transmission time information storage unit 160 to an earlier time(s) by a slot.

The connection maintenance signal transmission time determination unit 150 confirms whether or not the adjustment processing of the number of expected transmissions of keepalive signals has finished for all slots in the distribution creation period (step S203). If the adjustment processing has not finished for all slots yet (No in step S203), the connection maintenance signal transmission time determination unit 150 returns the processing back to step S202. If the adjustment processing has finished for all slots (Yes in step S203), the connection maintenance signal transmission time determination unit 150 ends the processing for the distribution creation period.

Next, an operation of the push server 100 when the push server 100 and a respective terminal(s) transmit and receive a keepalive signal(s) with each other by use of TCP unique communication will be described.

The TCP unique communication is a communication method on the TCP that a user or the like has developed uniquely. In the TCP unique communication, both a case in which a keepalive signal(s) is/are transmitted from the push server and a case in which a keepalive signal(s) is/are transmitted from a terminal(s) are supposed. In the TCP unique communication, the side that receives a keepalive signal returns a response to the side that transmits the keepalive signal. For example, it is assumed that a message including a character string "PING" (PING message) is transmitted as a keepalive signal in the TCP unique communication. In this case, the side that receives the PING message returns a message including a character string "PONG" as a response. The keepalive signals in the TCP unique communication may be other types of messages.

Adjustment processing of the number of expected transmissions of keepalive signals in the TCP unique communication in which the keepalive signals are transmitted from a push server is the same as the case using the long polling and description thereof will thus be omitted.

Figure 5:
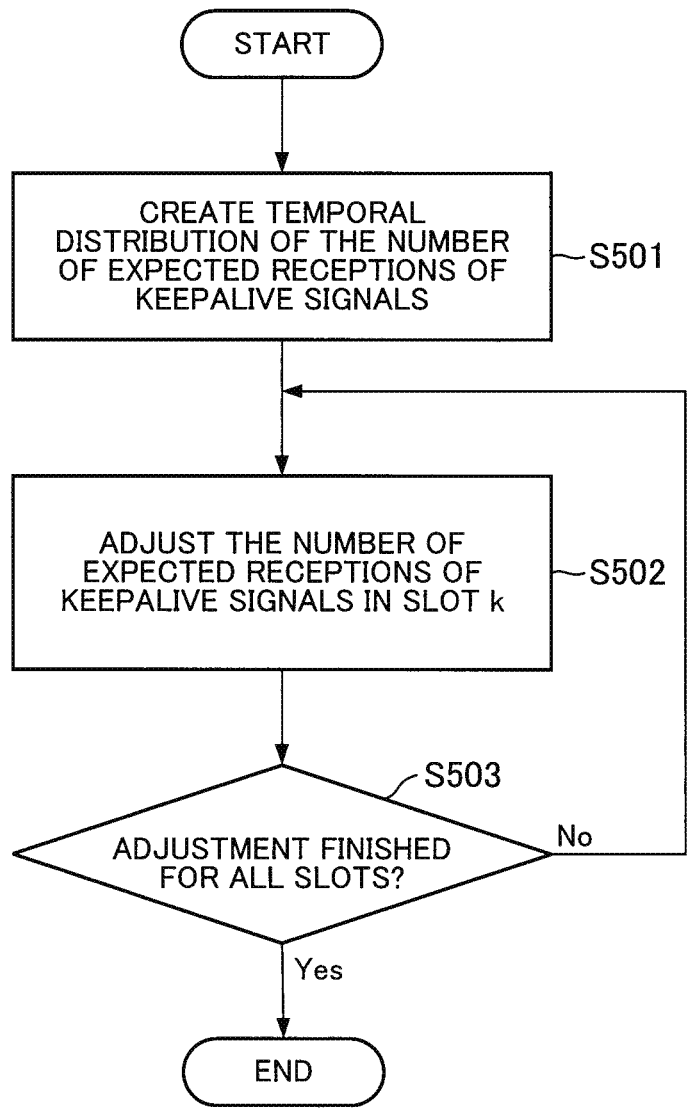
FIG. 5 is a flowchart illustrating adjustment processing of the number of expected receptions of keepalive signals.

In the TCP unique communication in which the keepalive signals are transmitted from a terminal(s), the connection maintenance signal transmission time determination unit 150 creates a temporal distribution of the number of expected receptions of keepalive signals in substitution for a temporal distribution of the number of expected transmissions of keepalive signals. FIG. 5 is a flowchart illustrating adjustment processing of the number of expected receptions of keepalive signals.

In the TCP unique communication in which the keepalive signals are transmitted from a terminal(s), the connection maintenance control units 230 of the terminals 200-1 to 200-n notify the push server 100 of the transmission time(s) of the next keepalive signal(s) in transmitting a keepalive signal(s).

The connection maintenance signal transmission and reception unit 140 of the push server 100 holds the transmission time(s) of the next keepalive signal(s) received from the respective terminal(s).

The connection maintenance signal transmission time determination unit 150 of the push server 100, based on the transmission time(s) of the next keepalive signal(s) for each terminal held by the connection maintenance signal transmission and reception unit 140, creates a temporal distribution of the number of expected receptions of keepalive signals (step S501). The connection maintenance signal transmission time determination unit 150, in a similar manner to the processing in step S201, creates a temporal distribution for the distribution creation period.

In step S501, first, the connection maintenance signal transmission time determination unit 150, based on the transmission time(s) of the next keepalive signal(s) for each terminal held by the connection maintenance signal transmission and reception unit 140, calculates an expected reception time(s) of a keepalive signal(s) from a respective terminal(s). Next, the connection maintenance signal transmission time determination unit 150, based on the calculated expected reception time(s) of a keepalive signal(s), calculates the number of expected receptions of keepalive signals in each slot k, into which the distribution creation period is divided by $\Delta t$.

After carrying out the processing in step S501, the connection maintenance signal transmission time determination unit 150 carries out an adjustment of the number of expected receptions of keepalive signals with respect to each slot (step S502).

In step S502, the connection maintenance signal transmission time determination unit 150 compares the number of expected receptions of keepalive signals in a slot k with a threshold value for the number of expected receptions of keepalive signals per slot. When the number of expected receptions of keepalive signals in the slot k exceeds the threshold value, the connection maintenance signal transmission time determination unit 150 adjusts the number of expected receptions of keepalive signals so as not to receive a keepalive signal(s) corresponding to the number of expected receptions of keepalive signals exceeding the threshold value in the slot k.

Specifically, first, the connection maintenance signal transmission time determination unit 150 identifies a keepalive signal(s) the expected reception time(s) of which is/are included in the slot k and selects a keepalive signal(s) corresponding to the number of expected receptions of keepalive signals exceeding the threshold value from among the identified keepalive signals. Next, the connection maintenance signal transmission time determination unit 150 identifies a terminal(s) that is/are a transmission source(s) of the keepalive signal(s) corresponding to the number of expected receptions of keepalive signals exceeding the threshold value. The connection maintenance signal transmission time determination unit 150, so that a keepalive signal(s) is/are transmitted to the identified terminal(s) in a slot that is earlier than the slot k, sets the expected transmission time(s) of the keepalive signal(s) and stores the set expected transmission time(s) in the expected transmission time information storage unit 160. In the first exemplary embodiment, the connection maintenance signal transmission time determination unit 150 sets the expected transmission time(s) of the keepalive signal(s) so that the keepalive signal(s) is/are transmitted in a slot k−1 immediately preceding the slot k.

As a consequence, the keepalive signal(s) is/are transmitted from the connection maintenance signal transmission and reception unit 140 to the terminal(s) identified by the connection maintenance signal transmission time determination unit 150 in the slot k−1 immediately preceding the slot k. As described above, transmitting a keepalive signal(s) from the push server side to the terminal(s), which is/are the transmission source(s) of the keepalive signal(s) corresponding to the number of expected receptions of keepalive signals exceeding the threshold value, earlier than the expected reception time(s) makes it possible to suppress the transmission(s) of a keepalive signal(s) from the terminal(s). Accordingly, it is possible to cause a keepalive signal(s) corresponding to the number of expected receptions of keepalive signals exceeding the threshold value not to be received by the push server 100 in the slot k.

The connection maintenance signal transmission time determination unit 150 confirms whether or not the adjustment processing of the number of expected receptions of keepalive signals has finished for all slots in the distribution creation period (step S503). If the adjustment processing has not finished for all slots yet (No in step S503), the connection maintenance signal transmission time determination unit 150 returns the processing to step S502. If the adjustment processing has finished for all slots (Yes in step S503), the connection maintenance signal transmission time determination unit 150 ends the processing for the distribution creation period.

As described above, in the first exemplary embodiment, when a transmission(s) and reception(s) of a keepalive signal(s) are carried out by use of the long polling, the number of expected transmissions of keepalive signals is adjusted so that a transmission time(s) of the keepalive signal(s) to a respective terminal(s) does/do not concentrate. Accordingly, it is possible to temporally distribute a processing load on the push server to maintain a connection(s) to a terminal(s) and maintain the real time property of message delivery. It is also possible to avoid an increase in the call loss probability on the push server.

When a transmission(s) and reception(s) of a keepalive signal(s) are carried out by use of the TCP unique communication in which a keepalive signal(s) is/are transmitted from the terminal(s), the number of expected receptions of keepalive signals is adjusted so that a reception time(s) of a keepalive signal(s) transmitted from the respective terminal(s) does/do not concentrate. With this configuration, it is possible to achieve the same advantageous effects similar to the case in which the long polling is used.

Although, in the first exemplary embodiment, a case in which a transmission(s) and reception(s) of a keepalive signal(s) are carried out by use of the long polling or the TCP unique communication was described, a transmission(s) and reception(s) of a keepalive signal(s) may also be carried out by use of a method other than the methods described above.

Although, in the first exemplary embodiment, a case in which the connection maintenance signal transmission time determination unit 150 creates a temporal distribution at every fixed time (5 minutes) was described as an example, the connection maintenance signal transmission time determination unit 150 may create a temporal distribution every time a predetermined number of keepalive signals are transmitted.

The communication system according to the present invention may be applied to a service other than the event notification service.

Second Exemplary Embodiment

A second exemplary embodiment of the present invention will be described below.

A configuration and operations of the second exemplary embodiment of the message delivery system are the same as the configuration and the operations of the first exemplary embodiment and description thereof will thus be omitted.

However, when a connection maintenance signal transmission time determination unit 150 carries out a transmission(s) and reception(s) of a keepalive signal(s) by use of the long polling, the connection maintenance signal transmission time determination unit 150 determines a keepalive signal(s) the transmission time(s) of which is/are to be shifted earlier in time, with respect to a slot(s) where the number of expected transmissions of keepalive signals exceeds a threshold value T, based on a preset degree of priority.

Specifically, in step S302, when the connection maintenance signal transmission time determination unit 150 selects $N_k$−T keepalive signal(s) from among keepalive signals the expected transmission time(s) of which is/are included in a slot k, the connection maintenance signal transmission time determination unit 150 selects a keepalive signal(s) with a long transmission interval(s) preferentially.

According to the second exemplary embodiment, because a keepalive signal(s) with a long transmission interval(s) is/are selected preferentially when a keepalive signal(s) the expected transmission time(s) of which is/are shifted earlier in time is/are selected, it is possible to make the average degree of variability in transmission intervals over all keepalive signals lower than in a case in which a keepalive signal(s) is/are selected at random. Accordingly, it is possible to suppress an increase in the number of keepalive signals.

For example, when the expected transmission time of a keepalive signal is shifted earlier in time and Δt is 1 sec., a transmission interval of 10 sec. becomes an interval of 9 sec. A transmission interval of 300 sec. becomes an interval of 299 sec. While, in the former case, there is a possibility that the number of signals increases 10%, the number of signals possibly increases 0.3% in the latter case. Therefore, by selecting a terminal with a long transmission interval of keepalive signals preferentially, it is possible to suppress an increase in the number of keepalive signals.

When a transmission(s) and reception(s) of a keepalive signal(s) are carried out by use of the TCP unique communication in which the keepalive signal(s) is/are transmitted from a terminal(s), similar processing may be carried out with respect to the number of expected receptions of keepalive signals. That is, when, for a time slot(s) where the number of expected receptions of keepalive signals exceeds a threshold value, a keepalive signal(s) corresponding to the number of expected receptions of keepalive signals exceeding the threshold value is/are selected from among keepalive signals expected to be received in the time slot(s), a keepalive signal(s) with a long reception interval(s) may be selected preferentially. With this processing, it is possible to transmit a keepalive signal(s) to a terminal(s) that is/are the transmission source(s) of the keepalive signal(s) with a long reception interval(s), preferentially.

Third Exemplary Embodiment

A third exemplary embodiment of the present invention will be described below.

A configuration and operations of the third exemplary embodiment of the message delivery system are the same as the configuration and the operations of the first exemplary embodiment and description thereof will thus be omitted.

However, when a connection maintenance signal transmission time determination unit 150 carries out a transmission(s) and reception(s) of a keepalive signal(s) by use of the long polling, the connection maintenance signal transmission time determination unit 150, as with the second exemplary embodiment, determines a terminal(s) to which a keepalive signal(s) the transmission time(s) of which is/are to be shifted earlier in time is/are addressed, with respect to a slot(s) where the number of expected transmissions of keepalive signals exceeds a threshold value T, based on a preset degree of priority.

As described above, the terminals and a push server carrying out transmissions and receptions of keepalive signals periodically cause the wireless statuses of the terminals to repeat standby statuses and active statuses alternately, a lot of control signals to flow on a mobile network, and congestion to take place on the mobile network. Thus, the shorter the transmission intervals of keepalive signals from the terminals connected to the mobile network become, the more control signals flow on the mobile network, and the more often congestion is likely to take place.

Therefore, when the connection maintenance signal transmission time determination unit 150, in step S302, selects $N_k$-T keepalive signal(s) from among keepalive signals the expected transmission times of which are included in a slot k, the connection maintenance signal transmission time determination unit 150 selects a keepalive signal(s) the transmission destination(s) of which is/are a terminal(s) that does/do not use the mobile network, that is, a terminal(s) that is/are connected to a push server 100 via a wireless LAN, such as Wifi (Wireless Fidelity) (Registered Trademark), preferentially. With this configuration, it is possible to prevent the transmission interval(s) of keepalive signals to the terminal(s) connected to the mobile network from becoming short.

According to the third exemplary embodiment, because, in selecting a keepalive signal(s) the expected transmission time(s) of which is/are shifted earlier in time, a keepalive signal(s) the transmission destination(s) of which is/are a terminal(s) that does/do not use the mobile network is/are selected preferentially, it is possible to suppress the number of control signals, which flow on the mobile network, to be lower than in a case in which a keepalive signal(s) is/are selected at random. Accordingly, it becomes easier to avoid congestion on the mobile network.

When a transmission(s) and reception(s) of a keepalive signal(s) are carried out by use of the TCP unique communication in which a keepalive signal(s) is/are transmitted from a terminal(s), the same processing may be carried out with respect to the number of expected receptions of keepalive signals. That is, when, for a time slot(s) where the number of expected receptions of keepalive signals exceeds a threshold value, a keepalive signal(s) corresponding to the number of expected receptions of keepalive signals exceeding the threshold value is/are selected from among keepalive signals that are expected to be received in the time slot(s), a keepalive signal(s) the transmission destination(s) of which is/are a terminal(s) that does/do not use the mobile network may be selected preferentially. With this configuration, it is possible to transmit a keepalive signal(s) to the terminal(s) that does/do not use the mobile network, preferentially.

Figure 6:
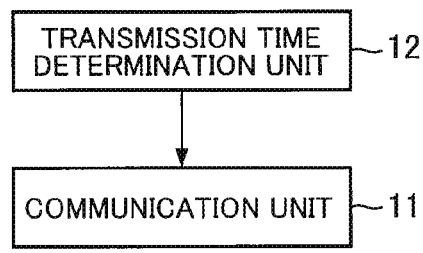
FIG. 6 is a block diagram illustrating a minimum configuration of a delivery device according to the present invention.
Figure 7:
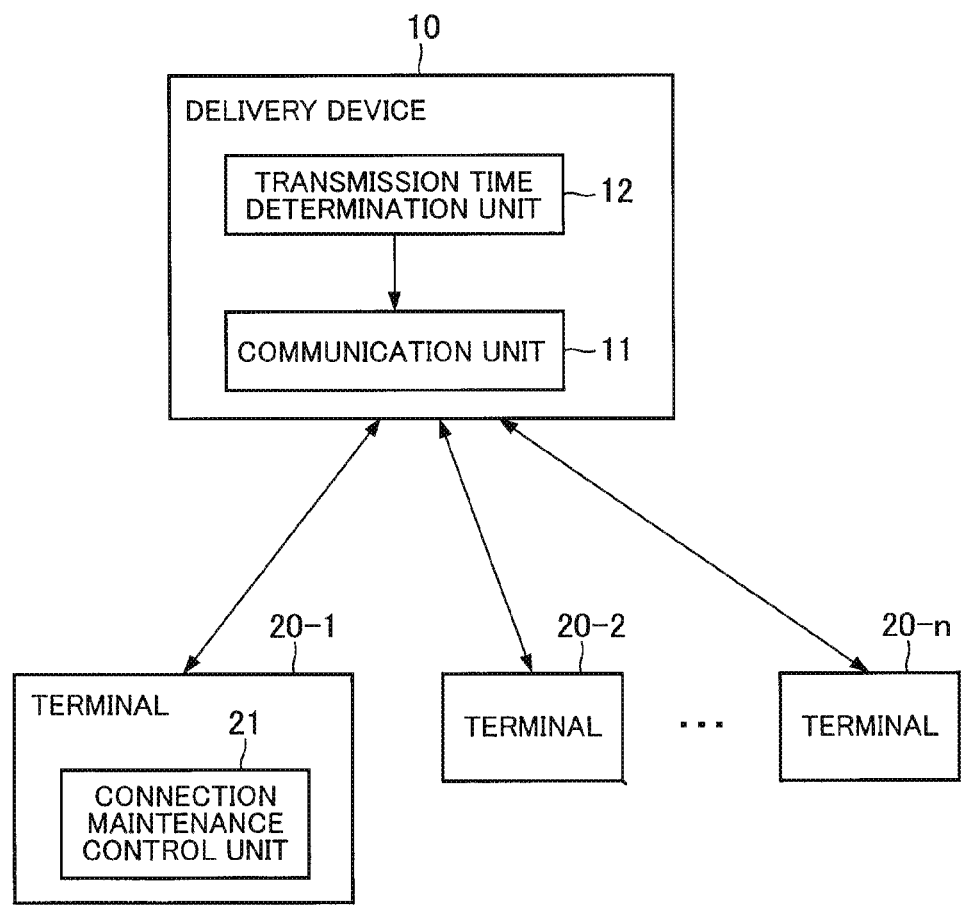
FIG. 7 is a block diagram illustrating a minimum configuration of a communication system according to the present invention.
Figures 8, 9:
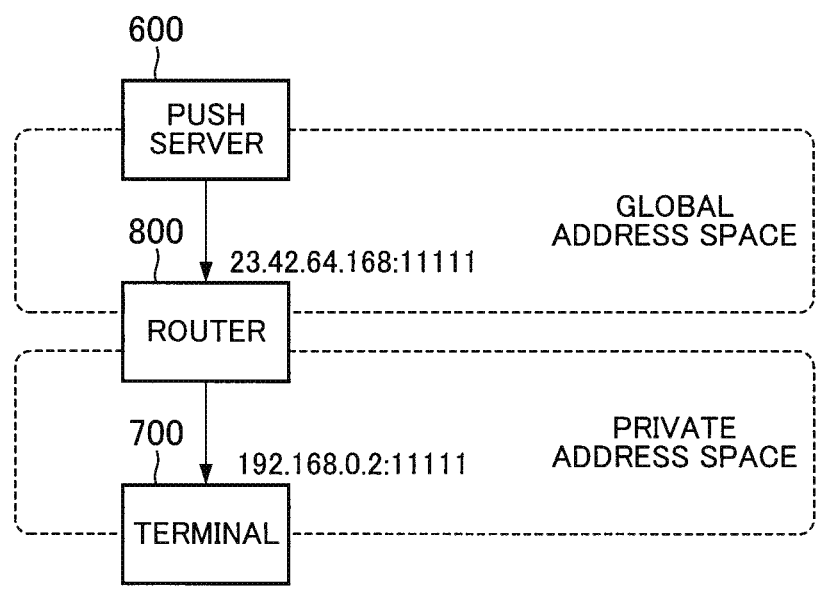
FIG. 8 is an explanatory diagram illustrating an example of a NAT translation table.
FIG. 9 is an explanatory diagram illustrating a manner in which a packet is transferred from a push server to a terminal via a router.
Figure 10A:
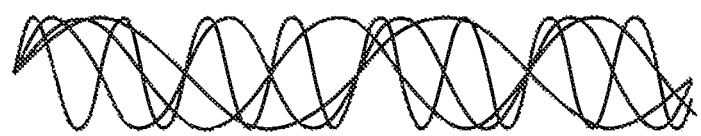
FIG. 10 is an explanatory diagram illustrating transmission cycles of keepalive signals.
Figure 10B:
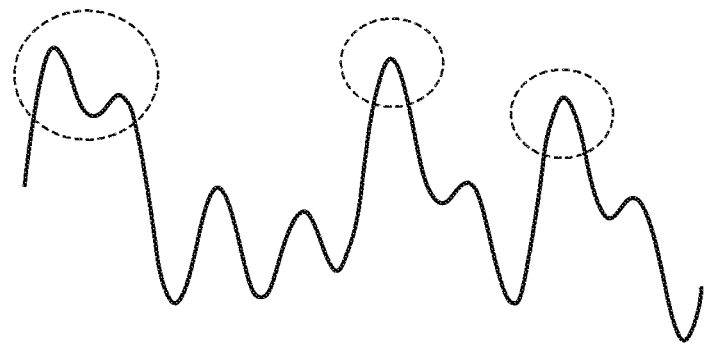
Figure 11:
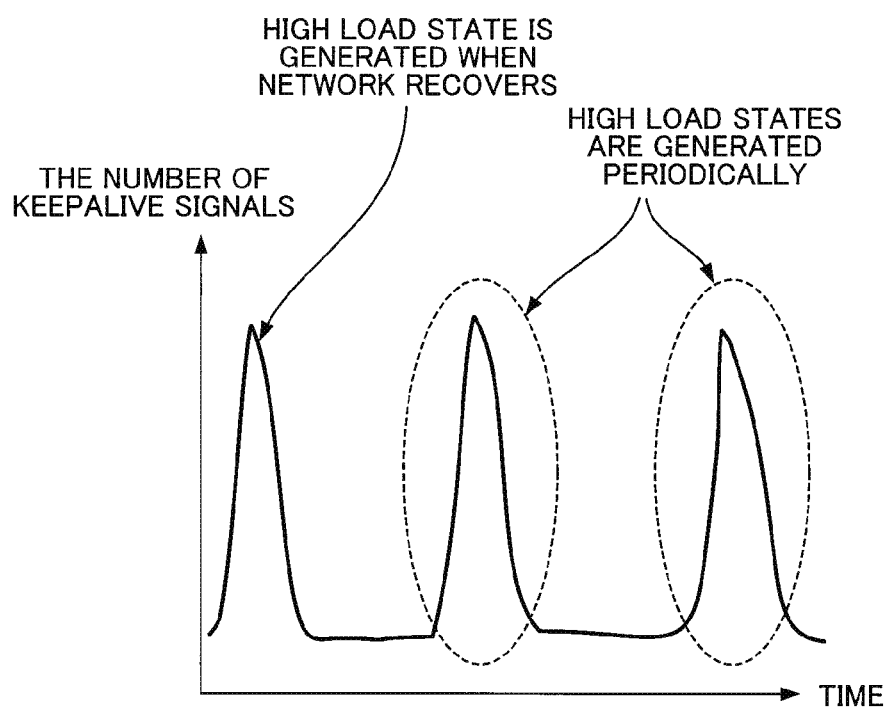
FIG. 11 is an explanatory diagram illustrating a manner in which the number of keepalive signals increases and decreases in recovering from a network failure.

FIG. 6 is a block diagram illustrating a minimum configuration of a delivery device according to the present invention. FIG. 7 is a block diagram illustrating a minimum configuration of a communication system according to the present invention.

As illustrated in FIG. 6, the delivery device (corresponding to the push server 100 illustrated in FIG. 1) includes a communication unit 11 (corresponding to the connection maintenance signal transmission and reception unit 140 in the push server 110 illustrated in FIG. 1) that transmits a connection maintenance signal(s) to maintain a connection(s) between the delivery device and a respective terminal(s) (corresponding to terminals 200-1 to 200-n illustrated in FIG. 1), which are connected to the delivery device, to the respective terminal(s) when there is no data to be delivered, and a transmission time determination unit 12 (corresponding to the connection maintenance signal transmission time determination unit 150 in the push server 110 illustrated in FIG. 1) that divides into a plurality of time slots a period in which the communication unit 11 transmits a connection maintenance signal(s), calculates the number of expected transmissions of connection maintenance signals with respect to each time slot based on connection maintenance signal interval information which indicates an interval(s) between connection maintenance signals to the respective terminal(s), and, when the number of expected transmissions exceeds a predetermined threshold value, makes the communication unit 11 transmit, in a time slot(s) that is/are earlier than the time slot(s), a connection maintenance signal(s) corresponding to the number of expected transmissions exceeding the threshold value.

With such a configuration, it is possible to distribute temporally a processing load on the delivery device to maintain a connection(s) to a terminal(s) and to maintain the real time property of message delivery. It is also possible to avoid an increase in the call loss probability on the delivery device.

In the exemplary embodiments described above, the following delivery device is also disclosed.

(1) The delivery device, wherein the transmission time determination unit 12, based on the connection maintenance signal interval information received from the respective terminal(s), calculates an expected transmission time(s) of a connection maintenance signal(s) with respect to each terminal, and calculates the number of expected transmissions of connection maintenance signals in each time slot based on the calculated expected transmission time(s).

With such a configuration, because the number of expected transmissions of connection maintenance signals for the respective terminal(s) is calculated based on the expected transmission time(s) received from the respective terminal(s), it is possible to create a temporal distribution of the number of expected transmissions of connection maintenance signals correctly.

(2) The delivery device, wherein the transmission time determination unit 12, when the number of expected transmissions of connection maintenance signals exceeds the threshold value in a time slot(s), updates the expected transmission time(s) of a connection maintenance signal(s) corresponding to the number of expected transmissions of connection maintenance signals exceeding the threshold value so that the connection maintenance signal(s) is/are transmitted in a time slot(s) that is/are earlier than the time slot(s), and the communication unit 11, based on the expected transmission time(s), transmits the connection maintenance signal(s).

With such a configuration, the transmission time determination unit can make the communication unit surely transmit, in a time slot(s) that is/are earlier than the time slot(s), the connection maintenance signal(s) corresponding to the number of expected transmissions of connection maintenance signals exceeding the threshold value.

(3) The delivery device, wherein the transmission time determination unit 12, when the number of expected transmissions of connection maintenance signals exceeds the threshold value in a time slot(s), selects preferentially a connection maintenance signal(s) with a long transmission interval(s) as a target(s) for updating the expected transmission time(s) from among connection maintenance signals that are expected to be transmitted in the time slot(s).

With such a configuration, it is possible to make the average degree of variability in transmission intervals over all keepalive signals lower than in a case in which a keepalive signal(s) the expected transmission time(s) of which is/are a target(s) for updating is/are selected at random. Accordingly, it is possible to suppress an increase in the number of keepalive signals.

(4) The delivery device, wherein the transmission time determination unit 12, when the number of expected transmissions of connection maintenance signals exceeds the threshold value in a time slot(s), selects preferentially, from among connection maintenance signals that are expected to be transmitted in the time slot(s), a connection maintenance signal(s) the transmission destination(s) of which is/are a terminal(s) that does/do not use the mobile network, as a target(s) for updating an expected transmission time(s).

With such a configuration, it is possible to suppress the number of control signals, which flow on the mobile network, to be lower than in a case in which a keepalive signal(s) the expected transmission time(s) of which is/are a target(s) for updating is/are selected at random. Accordingly, it becomes easier to avoid congestion on the mobile network.

(5) The delivery device, wherein the transmission time determination unit 12, when a respective terminal(s) connected to the delivery device transmit(s) a connection maintenance signal(s), divides into a plurality of time slots a period in which the connection maintenance signal(s) is/are received from the respective terminal(s), calculates the number of expected receptions of connection maintenance signals in each time slot based on the transmission time(s) of the connection maintenance signal(s) communicated from the respective terminal(s), and, when the number of expected receptions exceeds a predetermined threshold value, makes the communication unit 11 transmit, in a time slot(s) that is/are earlier than the time slot(s), a connection maintenance signal(s) to a terminal(s) that is/are a transmission source(s) of the connection maintenance signal(s) corresponding to the number of expected receptions exceeding the threshold value.

With such a configuration, when a transmission(s) and reception(s) of a keepalive signal(s) are carried out by use of the TCP unique communication in which a keepalive signal(s) is/are transmitted from the terminal(s), it is also possible to adjust the number of expected receptions of keepalive signals so that a reception time(s) of a keepalive signal(s) transmitted from the respective terminal(s) does/do not concentrate. With this configuration, it is possible to achieve similar advantageous effects to a case in which the long polling is used.

In the exemplary embodiments described above, a communication system as illustrated in FIG. 7 is also disclosed.

(7) A communication system, including a delivery device 10 and a plurality of terminals 20-1 to 20-n (corresponding to the terminals 200-1 to 200-n illustrated in FIG. 1) that are communicable with the delivery device 10, wherein the terminals 20-1 to 20-n include connection maintenance control units 21 (each corresponding to the connection maintenance control unit 230 in the terminal 200-1 illustrated in FIG. 1) that notify the delivery device of connection maintenance signal interval information to specify an interval(s) between connection maintenance signals to maintain a connection(s) between the delivery device and the terminal(s), and the delivery device 10 includes a communication unit 11 that, when there is no data to be delivered, transmits a connection maintenance signal(s) to the respective terminal(s), and a transmission time determination unit 12 that divides into a plurality of time slots a period in which the communication unit transmits a connection maintenance signal(s), calculates the number of expected transmissions of connection maintenance signals in each time slot based on the connection maintenance signal interval information received from the respective terminal(s), and, when the number of expected transmissions exceeds a predetermined threshold value, makes the communication unit transmit, in a time slot(s) that is/are earlier than the time slot(s), a connection maintenance signal(s) corresponding to the number of expected transmissions exceeding the threshold value.

With such a configuration, it is possible to temporally distribute a processing load on the delivery device to maintain a connection(s) to the terminal(s) and maintain the real time property of message delivery. It is also possible to avoid an increase in the call loss probability on the delivery device.

(8) The communication system, wherein the transmission time determination unit 12, based on the connection maintenance signal interval information received from the respective terminal(s), calculates an expected transmission time(s) of a connection maintenance signal(s) with respect to each terminal, and calculates the number of expected transmissions of connection maintenance signals in each time slot based on the calculated expected transmission time(s).

With such a configuration, because the number of expected transmissions of connection maintenance signals for the respective terminal(s) is calculated based on the expected transmission time(s) received from the respective terminal(s), it is possible to create a temporal distribution of the number of expected transmissions of connection maintenance signals correctly.

All or part of the embodiments described above may be described as in the following modes, but the present invention is not limited thereto.

(mode 1) A delivery device, including a communication unit 11 that, when there is no data to be delivered, transmits to a respective terminal(s) connected to the delivery device a connection maintenance signal(s) to maintain a connection(s) between the delivery device and the respective terminal(s), and a transmission time determination unit 12 that divides into a plurality of time slots a period in which the communication unit transmits the connection maintenance signal(s), calculates the number of expected transmissions of connection maintenance signals in each time slot based on connection maintenance signal interval information which indicates an interval(s) between connection maintenance signals to the respective terminal(s), and, when the number of expected transmissions exceeds a predetermined threshold value, makes the communication unit 11 transmit, in a time slot(s) that is/are earlier than the time slot(s), a connection maintenance signal(s) corresponding to the number of expected transmissions exceeding the threshold value.

(mode 2) The delivery device according to mode 1, wherein the transmission time determination unit 12, based on the connection maintenance signal interval information received from the respective terminal(s), calculates an expected transmission time(s) of a connection maintenance signal(s) with respect to each terminal, and calculates the number of expected transmissions of connection maintenance signals in each time slot based on the calculated expected transmission time(s).

(mode 3) The delivery device according to mode 2, wherein the transmission time determination unit 12, when the number of expected transmissions of connection maintenance signals exceeds the threshold value in a time slot(s), updates, so that a connection maintenance signal(s) corresponding to the number of expected transmissions of connection maintenance signals exceeding the threshold value is/are transmitted in a time slot(s) that is/are earlier than the time slot(s), the expected transmission time(s) of the connection maintenance signal(s), and the communication unit 11, based on the expected transmission time(s), transmits the connection maintenance signal(s).

(mode 4) The delivery device according to mode 3, wherein the transmission time determination unit 12, when the number of expected transmissions of connection maintenance signals exceeds the threshold value in a time slot(s), selects preferentially, among connection maintenance signals that are expected to be transmitted in the time slot(s), a connection maintenance signal(s) with a long transmission interval(s) as a target(s) of updating an expected transmission time(s).

(mode 5) The delivery device according to mode 3, wherein the transmission time determination unit 12, when the number of expected transmissions of connection maintenance signals exceeds the threshold value in a time slot(s), selects preferentially, from among connection maintenance signals that are expected to be transmitted in the time slot(s), a connection maintenance signal(s) the transmission destination(s) of which is/are a terminal(s) that does/do not use a mobile network, as a target(s) of updating the expected transmission time(s).

(mode 6) The delivery device according to any one of modes 1 to 5, wherein the transmission time determination unit 12, when the respective terminal(s) that is/are connected to the delivery device transmit(s) a connection maintenance signal(s), divides into a plurality of time slots a period in which the connection maintenance signal(s) are received from the respective terminal(s), calculates the number of expected receptions of connection maintenance signals in each time slot based on a transmission time(s) of the connection maintenance signal(s) communicated from the respective terminal(s), and, when the number of expected receptions exceeds a predetermined threshold value, makes the communication unit 11 transmit, in a time slot(s) that is/are earlier than the time slot(s), a connection maintenance signal(s) corresponding to the number of expected receptions exceeding the threshold value to a terminal(s) that is/are a transmission source(s) of the connection maintenance signal(s).

(mode 7) The delivery device according to mode 6, wherein the transmission time determination unit 12, when the number of expected receptions of connection maintenance signals exceeds the threshold value in a time slot(s), selects preferentially, among terminals that are the transmission sources of connection maintenance signals which are expected to be received in the time slot(s), a terminal(s) that is/are the transmission source(s) of a connection maintenance signal(s) with a long reception interval(s), as a transmission target(s) of a connection maintenance signal(s).

With such a configuration, when a transmission(s) and reception(s) of a keepalive signal(s) are carried out by use of the TCP unique communication in which the keepalive signal(s) is/are transmitted from the terminal(s), it is possible to suppress the average degree of variability in transmission intervals over all keepalive signals to be lower than in a case in which a terminal(s) that is/are the transmission target(s) of the keep alive signal(s) is/are selected at random. Accordingly, it is possible to suppress an increase in the number of keepalive signals.

(mode 8) The delivery device according to mode 6, wherein the transmission time determination unit 12, when the number of expected receptions of connection maintenance signals exceeds the threshold value in a time slot(s), selects preferentially, among terminals that are the transmission sources of connection maintenance signals which are expected to be received in the time slot(s), a terminal(s) that does/do not use the mobile network, as a transmission target(s) of a connection maintenance signal(s).

With such a configuration, when a transmission(s) and reception(s) of a keepalive signal(s) are carried out by use of the TCP unique communication in which the keepalive signal(s) is/are transmitted from the terminal(s), it is possible to suppress the number of control signals which flow on the mobile network to be lower than in a case in which a terminal(s) that is/are a transmission target(s) of the keepalive signal(s) is/are selected at random. Accordingly, it becomes easier to avoid congestion on the mobile network.

(mode 9) A communication system, including a delivery device 10 and a plurality of terminals 20-1 to 20-*n* that are communicable with the delivery device 10, wherein the terminals 20-1 to 20-*n* include connection maintenance control units 21 that notify the delivery device of connection maintenance signal interval information to specify an interval(s) between connection maintenance signals to maintain a connection(s) between the delivery device and the terminal(s), and the delivery device 10 includes a communication unit 11 that transmits a connection maintenance signal(s) to each terminal when there is no data to be delivered, and a transmission time determination unit 12 that divides into a plurality of time slots a period in which the communication unit transmits a connection maintenance signal(s), calculates the number of expected transmissions of connection maintenance signals with respect to each time slot based on the connection maintenance signal interval information received from the respective terminal(s), and, when the number of expected transmissions exceeds a predetermined threshold value, makes the communication unit 11 transmit, in a time slot(s) that is/are earlier than the time slot(s), a connection maintenance signal(s) corresponding to the number of expected transmissions exceeding the threshold value.

(mode 10) The communication system according to mode 9, wherein the transmission time determination unit 12, based on the connection maintenance signal interval information received from the respective terminal(s), calculates an expected transmission time(s) of a connection maintenance signal(s) with respect to each terminal, and calculates the number of expected transmissions of connection maintenance signals in each time slot based on the calculated expected transmission time(s).

(mode 11) The communication system according to mode 10, wherein the transmission time determination unit, when the number of expected transmissions of connection maintenance signals exceeds the threshold value in a time slot(s), updates, so that a connection maintenance signal(s) corresponding to the number of expected transmissions of connection maintenance signals exceeding the threshold value is/are transmitted in a time slot(s) that is/are earlier than the time slot(s), the expected transmission time(s) of the connection maintenance signal(s), and the communication unit transmits the connection maintenance signal(s) based on the expected transmission time(s).

With such a configuration, the transmission time determination unit can make the communication unit surely transmit, in a time slot(s) that is/are earlier than the time slot(s), the connection maintenance signal(s) corresponding to the number of expected transmissions of connection maintenance signals exceeding the threshold value.

(mode 12) The communication system according to mode 11, wherein the transmission time determination unit 12, when the number of expected transmissions of connection maintenance signals exceeds the threshold value in a time slot(s), selects preferentially, among connection maintenance signals expected to be transmitted in the time slot(s), a connection maintenance signal(s) with a long transmission interval(s) as a target(s) of updating an expected transmission time(s).

With such a configuration, it is possible to suppress the average degree of variability in transmission intervals over all keepalive signals to be lower than in a case in which a keepalive signal(s) the expected transmission time(s) of which is/are a target(s) of updating is/are selected at random. Accordingly, it is possible to suppress an increase in the number of keepalive signals.

(mode 13) The communication system according to mode 11, wherein the transmission time determination unit 12, when the number of expected transmissions of connection maintenance signals exceeds the threshold value in a time slot(s), selects preferentially, among connection maintenance signals which are expected to be transmitted in the time slot(s), a connection maintenance signal(s) the transmission destination(s) of which is/are a terminal(s) that does/do not use a mobile network, as a target(s) of updating an expected transmission time(s).

With such a configuration, it is possible to suppress the number of control signals which flow on the mobile network to be lower than in a case in which a keepalive signal(s) the expected transmission time(s) of which is/are a target(s) of updating is/are selected at random. Accordingly, it becomes easier to avoid congestion on the mobile network.

(mode 14) The communication system according to any one of modes 9 to 13, wherein the transmission time determination unit 12, when the respective terminal(s) connected to the delivery device transmit(s) a connection maintenance signal(s), divides into a plurality of time slots a period in which the connection maintenance signal(s) is/are received from the respective terminal(s), calculates the number of expected receptions of connection maintenance signals with respect to each time slot based on the transmission time(s) of the connection maintenance signal(s) communicated from the respective terminal(s), and, when the number of expected receptions exceeds a predetermined threshold value, makes the communication unit 11 transmit a connection maintenance signal(s), in a time slot(s) that is/are earlier than the time slot(s), to a terminal(s) that is/are the transmission source(s) of a connection maintenance signal(s) corresponding to the number of expected receptions exceeding the threshold value.

With such a configuration, when a transmission(s) and reception(s) of a keepalive signal(s) are carried out by use of the TCP unique communication in which the keepalive signal(s) is/are transmitted from the terminal(s), it is also possible to adjust the number of expected receptions of keepalive signals so that the reception time(s) of the keepalive signal(s) transmitted from the respective terminal(s) does/do not concentrate. In consequence, it is possible to achieve the same advantageous effects as in a case in which the long polling is used.

(mode 15) The communication system according to mode 14, wherein the transmission time determination unit 12, when the number of expected receptions of connection maintenance signals exceeds the threshold value in a time slot(s), selects preferentially, among terminals that are the transmission sources of the connection maintenance signals which are expected to be received in the time slot(s), a terminal(s) that is/are the transmission source(s) of a connection maintenance signal(s) with a long reception interval(s), as a transmission target(s) of a connection maintenance signal(s).

With such a configuration, when a transmission(s) and reception(s) of a keepalive signal(s) are carried out by use of the TCP unique communication in which the keepalive signal(s) is/are transmitted from the terminal(s), it is possible to suppress the average degree of variability in transmission intervals over all keepalive signals to be lower than in a case in which a terminal(s) that is/are the transmission target(s) of the keep alive signal(s) is/are selected at random. Accordingly, it is possible to suppress an increase in the number of keepalive signals.

(mode 16) The communication system according to mode 14, wherein the transmission time determination unit 12, when the number of expected receptions of connection maintenance signals exceeds the threshold value in a time slot(s), selects preferentially, among terminals that are the transmission sources of connection maintenance signals which are expected to be received in the time slot(s), a terminal(s) that is/are connected to a wireless LAN, as the transmission target(s) of a connection maintenance signal(s).

With such a configuration, when a transmission(s) and reception(s) of a keepalive signal(s) are carried out by use of the TCP unique communication in which the keepalive signal(s) is/are transmitted from the terminal(s), it is possible to suppress the number of control signals which flow on the mobile network to be lower than in a case in which a terminal(s) that is/are the transmission target(s) of the keepalive signal(s) is/are selected at random. Accordingly, it becomes easier to avoid congestion on the mobile network.

This application claims priority based on Japanese Patent Application No. 2012-240768, filed on Oct. 31, 2012, the entire disclosure of which is incorporated herein by reference.

The present invention was described above through embodiments thereof, but the present invention is not limited to the above embodiments. Various modifications that could be understood by a person skilled in the art may be applied to the configurations and details of the present invention within the scope of the present invention.

REFERENCE SIGNS LIST

10 Delivery device
11 Communication unit
12 Transmission time determination unit
20-1 to 20-n, 200-1 to 200-n, 700 Terminal
21, 230 Connection maintenance control unit
100, 600 Push server
110 Message transmission request reception unit
120 Message queue
130 Message transmission unit
140 Connection maintenance signal transmission and reception unit
150 Connection maintenance signal transmission time determination unit
160 Expected transmission time information storage unit
210 Message reception unit
220 Message notification unit
300, 800 Router
310 Packet transfer unit
320 NAT translation table

The invention claimed is:

1. A delivery device, comprising:
a communication unit that, when there is no data to be delivered, transmits, to respective terminals connected to the delivery device, connection maintenance signals to maintain connections between the delivery device and the respective terminals; and
a transmission time determination unit that divides into a plurality of time slots a period in which the communication unit transmits the connection maintenance signals, calculates the number of expected transmissions of connection maintenance signals with respect to each time slot on the basis of connection maintenance signal interval information indicating intervals between connection maintenance signals to the respective terminals, and, when the number of expected transmissions exceeds a predetermined threshold value, makes the communication unit transmit, in a time slot that is earlier than the time slot, a connection maintenance signal corresponding to the number of expected transmissions exceeding the threshold value.

2. The delivery device according to claim 1,
wherein the transmission time determination unit, on the basis of the connection maintenance signal interval information received from the respective terminals, calculates an expected transmission time of a connection maintenance signal with respect to each terminal, and calculates the number of expected transmissions of connection maintenance signals with respect to each time slot on the basis of the calculated expected transmission time.

3. The delivery device according to claim 2,
wherein the transmission time determination unit, when the number of expected transmissions of connection maintenance signals exceeds the threshold value in a time slot, updates, so that a connection maintenance signal corresponding to the number of expected transmissions of connection maintenance signals exceeding the threshold value is transmitted in a time slot that is earlier than the time slot, the expected transmission time of the connection maintenance signal, and
the communication unit transmits the connection maintenance signal based on the expected transmission time.

4. The delivery device according to claim 3,
wherein the transmission time determination unit, when the number of expected transmissions of connection maintenance signals exceeds the threshold value in a time slot, selects preferentially, among connection maintenance signals which are expected to be transmitted in the time slot, a connection maintenance signal with a long transmission interval as a target of updating the expected transmission time.

5. The delivery device according to claim 3,
wherein the transmission time determination unit, when the number of expected transmissions of connection maintenance signals exceeds the threshold value in a time slot, selects preferentially, among connection maintenance signals which are expected to be transmitted in the time slot, a connection maintenance signal the transmission destination of which is a terminal that does not use a mobile network, as a target of updating the expected transmission time.

6. The delivery device according to claim 1,
wherein the transmission time determination unit, when the respective terminals connected to the delivery device transmit connection maintenance signals, divides into a plurality of time slots a period in which the delivery device receives the connection maintenance signals from the respective terminals, calculates the number of expected receptions of connection maintenance signals with respect to each time slot on the basis of transmission times of the connection maintenance signals communicated from the respective terminals, and, when the number of expected receptions exceeds a predetermined threshold value, makes the communication unit transmit, to a terminal that is a transmission source of the connection maintenance signal corresponding to the number of expected receptions exceeding the threshold value, a connection maintenance signal in a time slot that is earlier than the time slot.

7. A communication system, comprising:
a delivery device; and
a plurality of terminals that are communicable with the delivery device,
wherein each of the terminals includes a connection maintenance control unit that communicates to the delivery device connection maintenance signal interval information to specify intervals between connection maintenance signals to maintain connections between the delivery device and the terminals, and
the delivery device includes:
a communication unit that, when there is no data to be delivered, transmits connection maintenance signals to the respective terminals; and
a transmission time determination unit that divides into a plurality of time slots a period in which the communication unit transmits the connection maintenance signals, calculates the number of expected transmissions of connection maintenance signals with respect to each time slot on the basis of the connection maintenance signal interval information received from the respective terminals, and, when the number of expected transmissions exceeds a predetermined threshold value, makes the communication unit transmit, in a time slot that is earlier than the time slot, a connection maintenance signal corresponding to the number of expected transmissions exceeding the threshold value.

8. The communication system according to claim 7, wherein the transmission time determination unit, on the basis of the connection maintenance signal interval information received from the respective terminals, calculates an expected transmission time of a connection maintenance signal with respect to each terminal, and calculates the number of expected transmissions of connection maintenance signals with respect to each time slot on the basis of the calculated expected transmission times.

9. A load balancing method which is carried out by a delivery device that, when there is no data to be delivered, transmits, to respective terminals connected to the delivery device, connection maintenance signals to maintain connections between the delivery device and the respective terminals, the method comprising the steps of:
  dividing into a plurality of time slots a period in which the delivery device transmits the connection maintenance signals;
  calculating the number of expected transmissions of connection maintenance signals with respect to each time slot on the basis of connection maintenance signal interval information indicating intervals between connection maintenance signals to the respective terminals; and
  when the number of expected transmissions exceeds a predetermined threshold value, transmitting a connection maintenance signal corresponding to the number of expected transmissions exceeding the threshold value in a time slot that is earlier than the time slot.

10. The load balancing method according to claim 9, the method further comprising the steps of:
  calculating an expected transmission time of a connection maintenance signal with respect to each terminal based on the connection maintenance signal interval information received from the respective terminals; and
  calculating the number of expected transmissions of connection maintenance signals with respect to each time slot on the basis of the calculated expected transmission times.

11. A non-transitory computer readable medium embodying a load balancing program which makes a computer operate
  a communication unit that, when there is no data to be delivered, transmits, to respective terminals connected to the computer, connection maintenance signals to maintain a connections between the computer and the respective terminals; and
  a transmission time determination unit that divides into a plurality of time slots a period in which the computer transmits the connection maintenance signals, calculates the number of expected transmissions of connection maintenance signals with respect to each time slot on the basis of connection maintenance signal interval information indicating intervals between connection maintenance signals to the respective terminals, and, when the number of expected transmissions exceeds a predetermined threshold value, transmits, in a time slot that is earlier than the time slot, a connection maintenance signal corresponding to the number of expected transmissions exceeding the threshold value.

12. The non-transitory computer readable medium according to claim 11 embodying a load balancing program:
  wherein the transmission time determination unit calculates an expected transmission time of a connection maintenance signal with respect to each terminal on the basis of the connection maintenance signal interval information received from the respective terminals, and calculates the number of expected transmissions of connection maintenance signals with respect to each time slot on the basis of the calculated expected transmission time.

\* \* \* \* \*